J. C. HARRIS & W. J. FLOOD.
TAG FASTENER.
APPLICATION FILED JAN. 19, 1909.

931,420.

Patented Aug. 17, 1909.

WITNESSES

INVENTORS
John Cooper Harris
William J. Flood
BY
ATTORNEYS

UNITED STATES PATENT OFFICE.

JOHN COOPER HARRIS AND WILLIAM J. FLOOD, OF SAVANNAH, GEORGIA.

TAG-FASTENER.

No. 931,420.  Specification of Letters Patent.  Patented Aug. 17, 1909.

Application filed January 19, 1909. Serial No. 473,074.

*To all whom it may concern:*

Be it known that we, JOHN COOPER HARRIS and WILLIAM J. FLOOD, both citizens of the United States, and residents of Savannah, in the county of Chatham and State of Georgia, have invented a new and Improved Tag-Fastener, of which the following is a full, clear, and exact description.

The object of the invention is to provide a new and improved tag fastener, more especially designed for securely fastening a tag to a bale of compressed cotton, hay or other compressed material, to identify the bale and to prevent the tag from becoming accidentally or designedly detached and lost.

For the purpose mentioned use is made of a nail for holding the tag, and adapted to be driven into the bale by the use of a hammer, mallet or other tool, the nail being provided on its shank at or near the point of the nail with pivoted barbs normally folding on the shank and capable of opening or spreading to prevent withdrawal of the nail from the bale.

A practical embodiment of the invention is represented in the accompanying drawings forming a part of this specification, in which similar characters of reference indicate corresponding parts in all the views.

Figure 1:
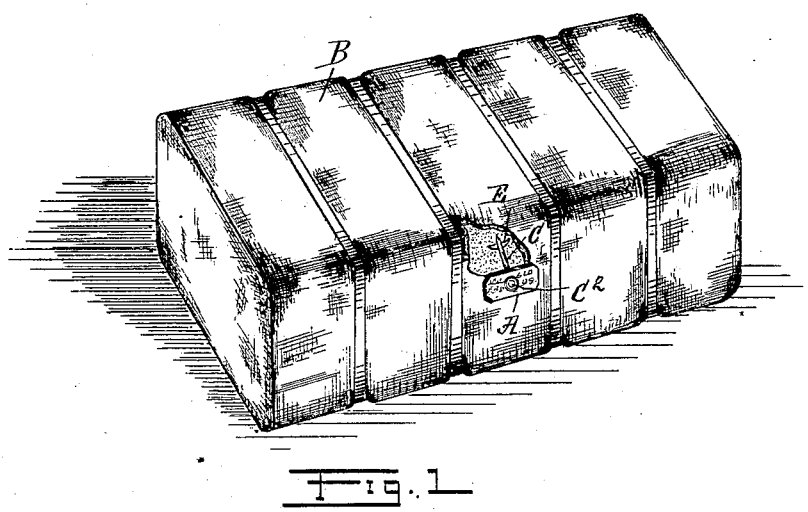
Figures 2, 3, 4:
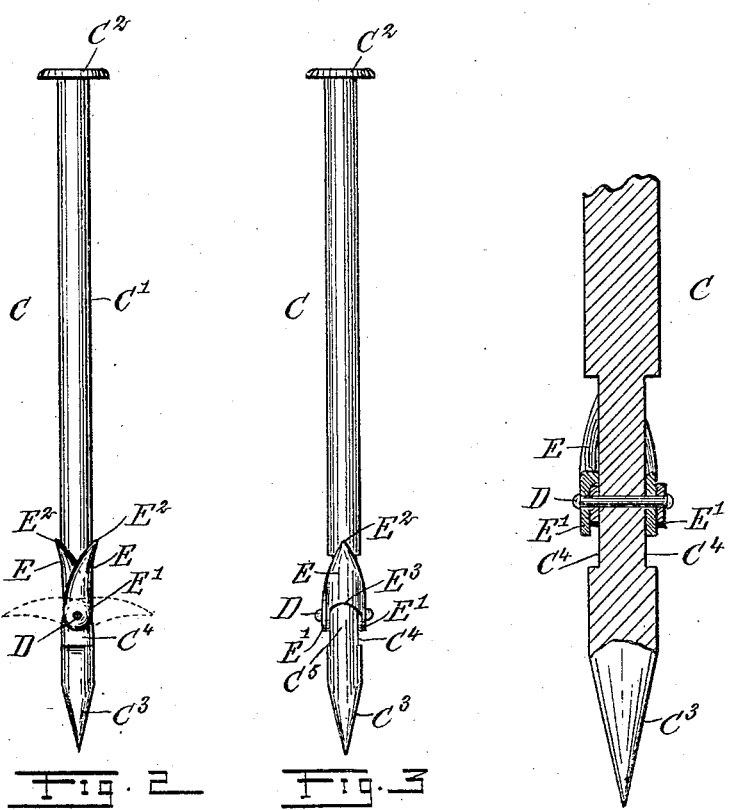

Figure 1 is a perspective view of the improvement as applied to a bale of compressed cotton, part of the bale being broken out; Figs. 2 and 3 are elevations of the nail; and Fig. 4 is an enlarged sectional elevation of the same.

In order to fasten a tag A to a bale B of compressed cotton or other compressed material, use is made of a nail C, adapted to be driven into the bale B by a hammer, mallet or other suitable tool. The nail C has its shank C' provided at one end with a head $C^2$, and at the other end with a point $C^3$, to facilitate the driving of the nail C into the bale B on striking the head $C^2$ with the hammer, mallet or other tool wielded by an operator.

The shank C' is provided, adjacent to the point $C^3$ and on opposite sides, with recesses $C^4$, and through the recessed portion of the shank extends transversely a pivot D, on the outer ends of which are fulcrumed the heels E' of barbs E, concaved at their inner faces to allow of snugly folding the barbs against the round portions $C^5$ connecting the recesses $C^4$ with each other, the points $E^2$ of the barbs extending toward the head $C^2$ of the nail C, at the time the barbs E are in a folded position on the opposite round portions $C^5$ of the shank C'. The heels E' of the barbs are in the shape of a fork, and the fork members of each heel E' engage the outer ends of the pivot D, to afford a proper and strong bearing for the barbs E, and to permit the barbs to readily swing into the folded position shown in Figs. 2, 3, 4, or into a spread or open position, as shown in Fig. 1, and in dotted lines in Fig. 2. By making the barbs E concave as described, the barbs are rendered exceedingly strong and durable and are not liable to bend or break when subjected to a heavy strain liable to be exerted when the bales are loaded, unloaded and otherwise handled.

The barbs E are capable of swinging into an open, approximately right angle position relative to the shank C', and in order to limit the opening movement of the barbs E, the lower ends $E^3$ of the barbs E abut against the shank C', thus holding the barbs E against further downward swinging motion.

The tag A may be attached to the nail C in any desired manner, but in practice the nail is preferably driven through the tag at an eyelet thereof, and then the nail is driven into the bale B so that the head $C^2$ of the nail holds the tag A tightly against the surface of the bale B, as indicated in Fig. 1. The nail is driven home with sufficient force to cause a slight rebounding of the nail in the compressed material, and in doing so the points $E^2$ of the barbs E cause the latter to open or spread, thus preventing withdrawal of the nail C from the bale B even if a heavy outward pull should accidentally be exerted on the nail while handling the bale in loading or unloading. By recessing the nail and pivoting the barbs to the recessed portion of the nail as shown, the barbs and their pivot will project but a short distance beyond the face of the nail, so that the driving of the nail into a bale of cotton or the like is facilitated. By this construction also, the likelihood of the material of the bale becoming entangled in the pivot of the barbs and thereby preventing the barbs from opening upon the withdrawal of the nail is reduced to a minimum.

The tag fastener is very simple and durable in construction, cheap to manufacture and easily applied to a bale of compressed material as above described.

Having thus described our invention, we claim as new and desire to secure by Letters Patent:

A tag fastener, comprising a shank having a head at one end and a point at the other end and provided with oppositely arranged recesses adjacent to its point, and barbs pivoted to the recessed portion of the shank, the said barbs being curved longitudinally to fit upon the curved portions of the shank between the recesses and to lap one upon the other in the said recesses and through which lapped portions, the pivot of the barbs passes, the lower ends of the barbs being notched to permit them to swing approximately at right angles to the shank.

In testimony whereof we have signed our names to this specification in the presence of two subscribing witnesses.

JOHN COOPER HARRIS.
WILLIAM J. FLOOD.

Witnesses:
J. E. WAY,
JOS. J. CARR.